United States Patent
Park

(10) Patent No.: US 10,501,093 B2
(45) Date of Patent: Dec. 10, 2019

(54) APPLICATION EXECUTION WHILE OPERATING VEHICLE

(71) Applicant: Google LLC, Mountain View, CA (US)

(72) Inventor: Keun Young Park, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/227,211

(22) Filed: Aug. 3, 2016

(65) Prior Publication Data

US 2017/0334457 A1 Nov. 23, 2017

Related U.S. Application Data

(60) Provisional application No. 62/337,573, filed on May 17, 2016.

(51) Int. Cl.
*B60W 50/12* (2012.01)
*B60W 50/14* (2012.01)
(Continued)

(52) U.S. Cl.
CPC ............ *B60W 50/12* (2013.01); *B60W 50/14* (2013.01); *G05B 19/4155* (2013.01);
(Continued)

(58) Field of Classification Search
CPC .............. B60W 50/14; B60W 50/12; B60W 2050/146; B60W 2520/04; B60W 2710/30; G05B 19/4155; G05B 2219/2637
See application file for complete search history.

(56) References Cited

U.S. PATENT DOCUMENTS 7,323,970 B1  1/2008  Murray et al.
8,494,576 B1  7/2013  Bye et al.
(Continued)

FOREIGN PATENT DOCUMENTS

CN  103154862 A  6/2013
CN  104816687 A  8/2015
(Continued)

OTHER PUBLICATIONS

International Search Report and Written Opinion in International Application No. PCT/US2016/063812, dated Feb. 6, 2017, 13 pages.
(Continued)

*Primary Examiner* — Behrang Badii
*Assistant Examiner* — Daniel L Greene
(74) *Attorney, Agent, or Firm* — Shumaker & Sieffert, P.A.

(57) ABSTRACT

Enabling or disabling vehicle applications for execution is described. When a request to execute an application is received by a vehicle processing system or a change in the operational status of a vehicle is detected, the vehicle processing system may obtain classification data classifying the application and the current operational status of the vehicle. The classification data may indicate an application type of the application and the types of vehicle operation statuses that the application can be executed under. Based on the classification data, vehicle operation status, and one or more rules, the vehicle processing system may determine whether to enable execution of the application or deny execution of the application in the vehicle.

20 Claims, 6 Drawing Sheets

(51) Int. Cl.
*G06Q 10/10* (2012.01)
*G05B 19/4155* (2006.01)

(52) U.S. Cl.
CPC ....... *G06Q 10/10* (2013.01); *B60W 2050/146* (2013.01); *B60W 2520/04* (2013.01); *B60W 2710/30* (2013.01); *G05B 2219/2637* (2013.01)

(56) References Cited

U.S. PATENT DOCUMENTS

| | | | |
|---|---|---|---|
| 8,914,012 | B2 | 12/2014 | Crosbie et al. |
| 9,308,920 | B2 | 4/2016 | Konigsberg |
| 9,374,423 | B2 | 6/2016 | Crosbie et al. |
| 9,917,895 | B2 | 3/2018 | Choi et al. |
| 2007/0185728 | A1 | 8/2007 | Schwarz et al. |
| 2011/0117878 | A1* | 5/2011 | Barash ............... H04W 4/90 455/404.2 |
| 2011/0313594 | A1 | 12/2011 | Kato et al. |
| 2012/0040650 | A1 | 2/2012 | Rosen |
| 2012/0079002 | A1 | 3/2012 | Boll et al. |
| 2012/0206323 | A1* | 8/2012 | Osterhout ......... G02B 27/0093 345/8 |
| 2012/0303392 | A1* | 11/2012 | Depura ............ H04W 52/0258 705/4 |
| 2013/0117839 | A1 | 5/2013 | White et al. |
| 2013/0150004 | A1 | 6/2013 | Rosen |
| 2013/0268997 | A1 | 10/2013 | Clancy, III et al. |
| 2014/0306833 | A1* | 10/2014 | Ricci ................. B60Q 1/00 340/901 |
| 2014/0365928 | A1 | 12/2014 | Boelter et al. |
| 2015/0217777 | A1 | 8/2015 | Konigsberg |
| 2015/0221247 | A1* | 8/2015 | Herger ............... G02B 27/017 345/8 |
| 2015/0226560 | A1 | 8/2015 | Chandrasekar et al. |
| 2015/0227927 | A1 | 8/2015 | Votaw et al. |
| 2015/0242769 | A1* | 8/2015 | Kezeu ................. G06Q 10/063 705/7.11 |
| 2015/0341436 | A1 | 11/2015 | Choi et al. |
| 2015/0373622 | A1* | 12/2015 | Tzannes ............. H04M 1/64 455/41.2 |
| 2016/0381199 | A1* | 12/2016 | Pelly .................. H04L 43/16 455/557 |
| 2017/0018007 | A1* | 1/2017 | DeFrank ............ G06Q 30/0262 |

FOREIGN PATENT DOCUMENTS

| | | |
|---|---|---|
| CN | 105095338 A | 11/2015 |
| EP | 2124177 | 11/2009 |
| EP | 2980744 | 2/2016 |
| WO | 2014/172369 | 10/2014 |

OTHER PUBLICATIONS

Written Opinion issued in International Application No. PCT/US2016/063812, dated Mar. 16, 2018, 6 pages.
International Preliminary Report on Patentability issue din International Application No. PCT/US2016/063812, dated Jul. 16, 2018, 25 pages.
International Preliminary Report on Patentability from counterpart International Application No. PCT/US2016/063812, dated Jul. 16, 2018, 10 pp.
First Office Action and Search Report, and translation thereof, from counterpart Chinese Application No. 201611223823.6, dated Feb. 19, 2019, 23 pp.
Second Office Action and Search Report, and translation thereof, from counterpart Chinese Application No. 201611223823.6, dated Jun. 3, 2019, 8 pp.

* cited by examiner

APPLICATION EXECUTION WHILE OPERATING VEHICLE

CROSS-REFERENCE TO RELATED APPLICATION

This application claims priority from and the benefit of U.S. Provisional Application No. 62/337,573, filed on May 17, 2016, which is incorporated by reference herein.

FIELD

This disclosure generally relates to automobiles.

BACKGROUND

Vehicles are becoming increasingly interactive with drivers. Vehicle systems and user interfaces allow drivers to select several desirable applications such as, for example, a navigation application for executing navigation operations. In general, various suitable applications can be downloaded to a vehicle. However, as the number of applications that can be installed and executed on a vehicle increases, safety concerns due to, for example, driver distraction, are important to address.

SUMMARY

This disclosure generally describes a system and method for controlling execution of vehicle applications when a vehicle is being operated by a driver.

Innovative aspects of the subject matter described in this specification include, in some implementations, a computer-implemented method to perform actions. The actions include receiving an indication to execute an application in a vehicle, obtaining classification data associated with the application, determining, by a vehicle processor, an operating status of the vehicle, and determining, by the vehicle processor, whether to execute the application based on the operating status of the vehicle, the classification data associated with the application, and one or more execution rules. In response to determining to execute the application based on the operating status of the vehicle, the classification data associated with the application, and the one or more execution rules, executing the application in the vehicle is transmitted.

Implementations may each optionally include one or more of the following features. For instance, in some implementations, the classification data associated with the application includes: data indicating that the application is a front-end application or a back-end application; data indicating that the application is executable in a particular driving mode; data indicating a vehicle make and model on which the application is executable; and metadata associated with the application.

In some implementations, receiving an indication to execute an application in a vehicle includes one of: receiving a user input to execute the application in the vehicle; receiving an instruction from a second application to execute the application in the vehicle; and receiving an instruction to execute the application in the vehicle in response to a vehicle trigger event.

In some implementations, obtaining classification data associated with the application comprises one or more of: retrieving one or more portions of the classification data associated with the application from one or more storage devices; and receiving one or more second portions of the classification data associated with the application from a network server.

In some implementations, determining, by a vehicle processor, an operating status of the vehicle comprises one or more of: determining a gear the vehicle is operating in; determining a movement or speed of the vehicle; and determining a number of passengers in the vehicle.

In some implementations, the actions further include receiving application data from a network server, extracting the classification data associated with the application from the application data, and storing the classification data associated with the application in a vehicle storage unit or a cloud-based database.

In some implementations, the actions further include responsive to determining not to execute the application based on the operating status of the vehicle, the classification data associated with the application, and the one or more execution rules, transmitting a denial message indicating that execution of the application is denied.

In some implementations, the denial message is output by a speaker, content of the denial message is output by a graphical user interface in the vehicle, or the denial message is transmitted to a portable electronic device associated with a driver of the vehicle.

In some implementations, transmitting a denial message indicating that execution of the application is denied includes transmitting an indication that execution of a back-end application has been terminated, paused, or delayed, or transmitting an indication that execution of a front-end application is blocked.

In some implementations, in response to determining to execute the application based on the operating status of the vehicle, a graphical user interface in the vehicle is controlled to display output data associated with execution of the application.

In some implementations, determining, by the vehicle processor, whether to execute the application based on the operating status of the vehicle, the classification data associated with the application, and one or more execution rules includes one or more of determining whether the application is a front-end application or a back-end application, determining whether the application is classified as being operable in one or more of a parked vehicle mode and a moving vehicle mode, and determining a location of the vehicle and obtaining one or more application execution rules based on the location of the vehicle.

In some implementations, determining to execute the application based on the operating status of the vehicle, the classification data associated with the application, and one or more execution rules further includes determining that the application is a front-end application, determining that the operating status of the vehicle indicates a parked vehicle mode, determining that the location of the vehicle and the one or more execution rules permit the execution of the application, and determining to execute the application.

In some implementations, determining to execute the application based on the operating status of the vehicle, the classification data associated with the application, and one or more execution rules further includes determining that the application is the back-end application, responsive to determining that the application is a back-end application, determining a likely effect of executing the application on one or more front-end applications, determining that the likely effect of executing the back-end application on one or more front-end applications is less than a threshold amount, determining that the location of the vehicle and the one or more execution rules permit the execution of the back-end application, and determining to execute the back-end application.

Other implementations of these aspects include corresponding systems, apparatus, computer-readable storage mediums, and computer programs configured to implement the actions of the above-noted methods.

The details of one or more implementations are set forth in the accompanying drawings and the description below. Other features and advantages will become apparent from the description, the drawings, and the claims.

BRIEF DESCRIPTION OF THE DRAWINGS

Like reference numbers and designation in the various drawings indicate like elements.

DETAILED DESCRIPTION

This disclosure generally describes a system and method for controlling execution of vehicle applications.

According to implementations, when a request to execute an application (app) is received by a vehicle processing system or a change in the operational status of a vehicle is detected, the vehicle processing system may perform several actions to enable or disable execution of the application in the vehicle.

In some implementations, when a request to execute an application is received, the vehicle processing system may obtain classification data classifying the application and the current operational status of the vehicle. The classification data may indicate an application type of the application and the types of vehicle operation statuses that the application can be executed under. For example, the classification data of a text messaging application may indicate that the text messaging application is a front-end application that uses a graphical user interface but should only be executed when the vehicle is in a parking state or not moving. Applications that can be used while driving may display a specific graphical indicator, which may be any suitable graphical representation such as an icon, image, design, text, or pattern. Based on the classification data, vehicle operation status, and one or more rules, the vehicle processing system determines whether to enable execution of the application or deny execution of the application.

In some implementations, when a change in the operational status of a vehicle is detected, the vehicle processing system determines the applications that are being executed in the vehicle. For one or more of the vehicle applications being executed at the time of the change in the vehicle operation status, the vehicle processing system may obtain classification data classifying the application. Based on the classification data, vehicle operation status, and one or more rules, the vehicle processing system determines whether to continue the execution of the application or discontinue the execution of the application. For example, in some cases, an electronic game application may be classified as an application that should only be executed when the vehicle is in a parking state or not moving. Thus, if the vehicle changes from, for example, a park gear to a drive gear and begins to move, the vehicle processing system of the vehicle will disable the electronic game application so that the driver is not distracted while the vehicle is moving. The vehicle processing system may output a driving safety message, which, in some implementations, may be discontinued after a predetermined time period. A default home screen may be displayed by the vehicle processing system after the driving safety message is no longer output.

Figure 1:
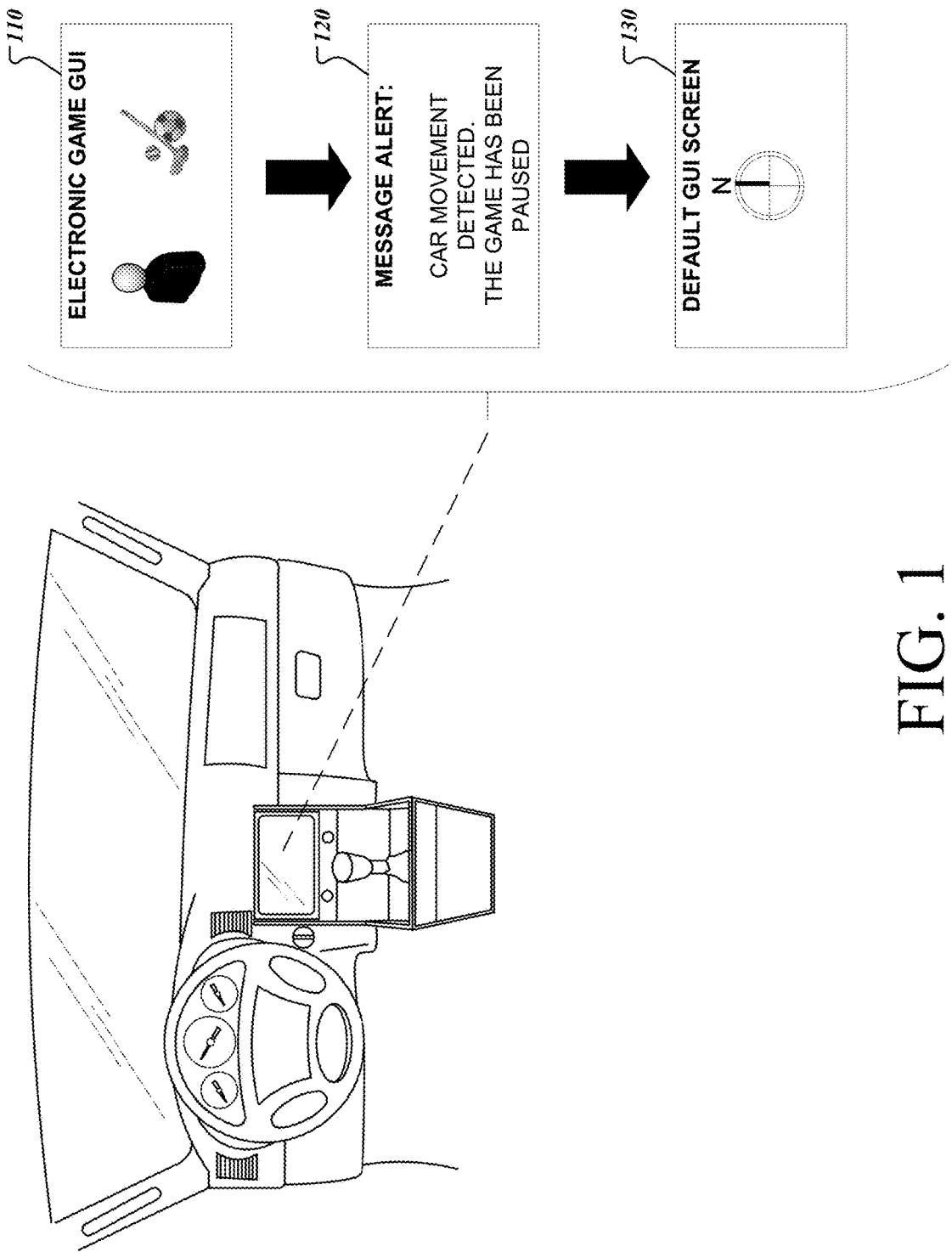
FIG. 1 depicts an exemplary scenario of disabling execution of an electronic game application when a vehicle begins to move.

FIG. 1 depicts an exemplary scenario of disabling execution of an electronic game application when a vehicle begins to move. In the exemplary scenario, a driver may be playing an electronic game using the graphical user interface (GUI) of a stationary vehicle the driver is sitting in. Although the example of an electronic game is used with reference to FIG. 1, it should be understood that the depicted scenario may generally apply for various applications that require the driver's attention. Other examples of applications include, for example, shopping applications, web browsing applications, and text messaging applications. Screen 110 of the vehicle GUI illustrates an example in which the driver is playing an electronic game.

If the vehicle begins to move or a gear change from parking to a drive or reverse gear is detected, a processor in the vehicle determines all the applications that are currently running in the vehicle and whether these applications are permitted to continue to be executed when the vehicle is moving. As explained in further detail below, one or more rules and conditions and data classifying the respective applications are used to determine which applications are permitted to continue to be executed when a vehicle operating status changes.

Referring to the exemplary implementation in FIG. 1, a vehicle processor in a vehicle processing system obtains classification data associated with the electronic game application. The vehicle processor then determines whether the classification data indicates that the electronic game application is an application that can be executed when the vehicle is in a driving operational status. Additionally, the vehicle processor determines whether the vehicle system rules and conditions permit an application to be executed in the driving operational status of the vehicle.

Based on the classification data associated with the electronic game application, the vehicle operating status, and the vehicle system rules and conditions, the vehicle processor determines that the electronic game application cannot continue to be executed. As a result, the vehicle processor sends instructions to pause or terminate the game. As illustrated in screen 120, a message is displayed to the driver through the vehicle GUI that the game has been paused. The game may be paused until another change in the vehicle operation status occurs such as, for example, the vehicle returning to a stationary state or the gear of the vehicle being positioned in a parking gear position.

After displaying a message that the electronic game application has been paused or terminated, the vehicle processor controls the vehicle GUI to return to a default GUI screen 130. The default GUI screen 130 may be any suitable screen that is configured by a vehicle manufacturer, the driver, or the last screen displayed prior to execution of the electronic game application. For example, the default GUI screen 130 may be a screen displaying a navigation application screen, a radio application screen, a weather application screen, or a default screen set by the vehicle manufacturer. The default GUI screen 130 may be displayed for a predetermined time, set by the vehicle manufacturer, after the message indicating that the electronic game application has been paused or terminated is displayed.

Figure 2:
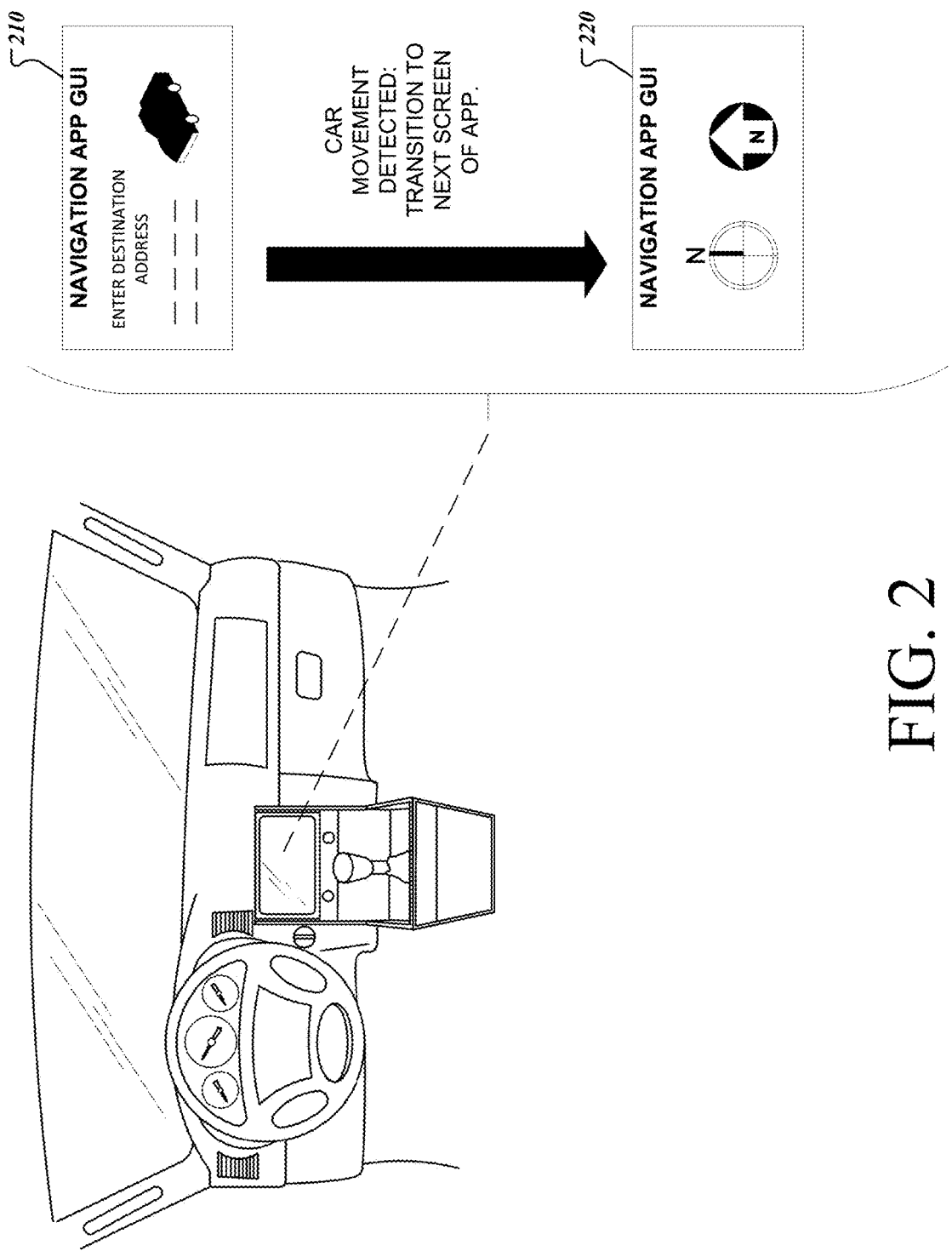
FIG. 2 depicts an exemplary scenario of continuing execution of an application in response to a change in a vehicle operating status.

FIG. 2 depicts an exemplary scenario of continuing execution of an application in response to a change in the vehicle operating status. In the illustrated scenario, a driver is utilizing a navigation application to navigate from one place to another. A navigation application GUI is displayed in screen 210 to prompt the driver to enter a destination address indicating where the driver would like to drive to. In some implementations, the driver may utilize a speech recognition application to provide the destination address. In some implementations, the driver may input the destination address using one or more suitable touch input methods.

After the destination address has been entered, the vehicle processor may detect that a vehicle operating status has changed. For example, the vehicle processor may detect that the car has started moving or that the vehicle gear has changed from a parking gear to a drive gear. In response to the change in the vehicle operating status, the vehicle processor determines all the applications that are currently running in the vehicle and whether these applications are permitted to continue to be executed when the vehicle is moving or in the current vehicle operating status. As explained in further detail below, one or more rules and conditions and data classifying the respective applications are used to determine which applications are permitted to continue to be executed when a vehicle operating status changes.

Referring to the exemplary implementation in FIG. 2, the vehicle processor obtains classification data associated with the navigation application. The vehicle processor then determines whether the classification data indicates that the navigation application is an application that can be executed when the vehicle is in a driving operational status and whether the vehicle system rules and conditions permit an application to be executed in the driving operational status of the vehicle.

In FIG. 2, based on the classification data associated with the navigation application, the vehicle operating status, and the vehicle system rules and conditions, the vehicle processor determines that the navigation application can continue to be executed. As a result, the navigation application GUI transitions to the next screen 220 providing the driver instructions for arriving at the destination address. The driver does not experience any delay or inconvenience in this process as the vehicle processor's above-described operations occur in the background and are not apparent to the driver.

Figure 3:
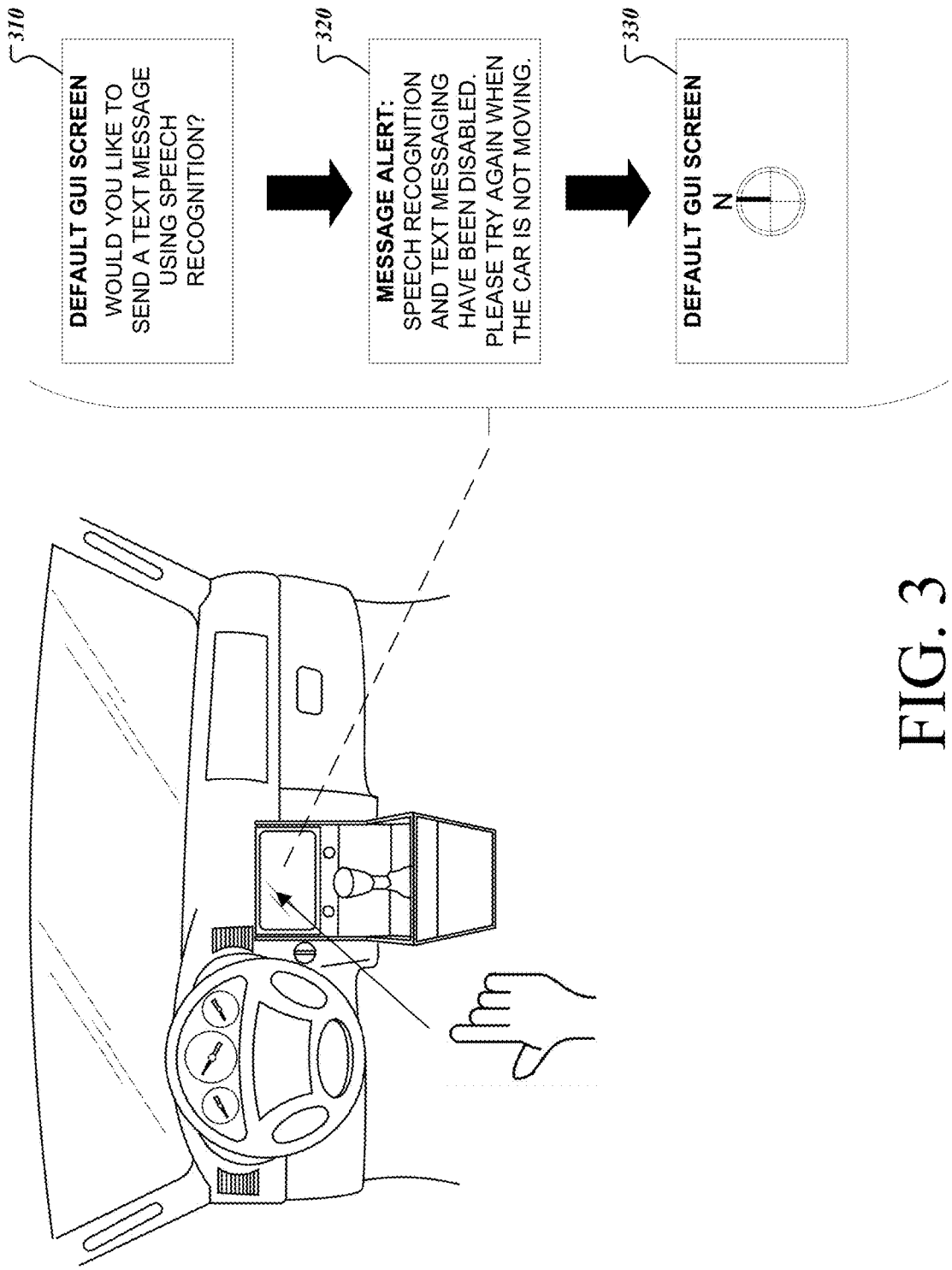
FIG. 3 depicts an exemplary scenario of preventing an application from being executed.

FIG. 3 depicts an exemplary scenario of preventing an application from being executed. In FIG. 3, a driver may select an option to send a text message through the vehicle GUI. For example, the driver may touch the screen of the vehicle GUI at a screen area where an icon corresponding to a text message application is displayed. In general, various suitable methods may be utilized for the driver to communicate to the vehicle processor that the driver would like to initiate execution of an application. Additionally or optionally, the driver can indicate the manner in which the driver would like to compose a text message. For example, the driver can indicate that he would like to compose a text message using a speech recognition application or a speech-to-text application.

After receiving one or more touch inputs through the vehicle GUI indicating that the driver would like to send a text message using a speech recognition application, the vehicle processor may control the vehicle GUI to output a message confirming the driver's instructions. For example, as shown in FIG. 2, the screen 310 of the vehicle GUI may display a confirmation message asking the driver to confirm the driver's selections.

After receiving a confirmation of the selection from the driver, the vehicle processor determines: (i) the current vehicle operating status; (ii) the applications that are currently running in the vehicle; (iii) whether the applications currently running in the vehicle can be executed in the current vehicle operating status. As explained in further detail below, one or more rules and conditions and data classifying the respective applications are used to determine which applications are permitted to be executed any time a vehicle operating status changes.

Referring to the exemplary implementation in FIG. 3, the vehicle processor obtains classification data associated with the text messaging application and speech recognition application. The vehicle processor then determines whether the classification data indicates that the text messaging application and speech recognition application are applications that can be executed in the current vehicle operation status. Additionally, the vehicle processor determines whether the vehicle system rules and conditions permit the applications to be executed in the driving operational status of the vehicle.

In the illustrated implementation in FIG. 3, the driver makes the touch input while driving the car. Based on the classification data associated with the text messaging application, the vehicle operating status, and the vehicle system rules and conditions, in some cases, the vehicle processor may determine that the text messaging application cannot be executed because the driver is currently driving the vehicle. In addition, the vehicle processor may also determine that executing the speech recognition application may have an adverse impact on the execution of other applications that the driver is also using. For example, the vehicle processor may determine that if the speech recognition application were executed, the execution would slow down the navigation application which the driver is relying on for directions and may result in the navigation application providing untimely directions.

As a result, the vehicle processor may determine that neither the speech recognition application nor the text messaging application can be executed. The vehicle processor then controls the vehicle GUI to display, as shown in screen 320, a denial message indicating that the driver's request to execute the speech recognition application and the text messaging application has been denied. The vehicle processor may also communicate to the driver when the request can be granted or conditions during which the driver should request the execution of the applications again. In some implementations, the messages communicated to the driver from the vehicle processing system may be output using audio signals in conjunction with or separately from the messages displayed through the vehicle GUI.

After displaying the denial message, the vehicle processor controls the vehicle GUI to return to a default GUI screen 330.

In some cases, the vehicle processor may determine that the text messaging application is permitted to be executed provided one or more conditions are satisfied. For example, the vehicle processor may determine that the text messaging application can be executed if a speech recognition or speech-to-text application is used to receive words that the driver may wish to include in a text message. If the vehicle system has a capacity to support execution of the speech recognition or speech-to-text application in addition to the text messaging application and the driver agrees to use the speech recognition or speech-to-text application, the text messaging application may be executed.

A method for controlling execution of vehicle applications is described with reference to FIGS. 4 and 5.

Figure 4:
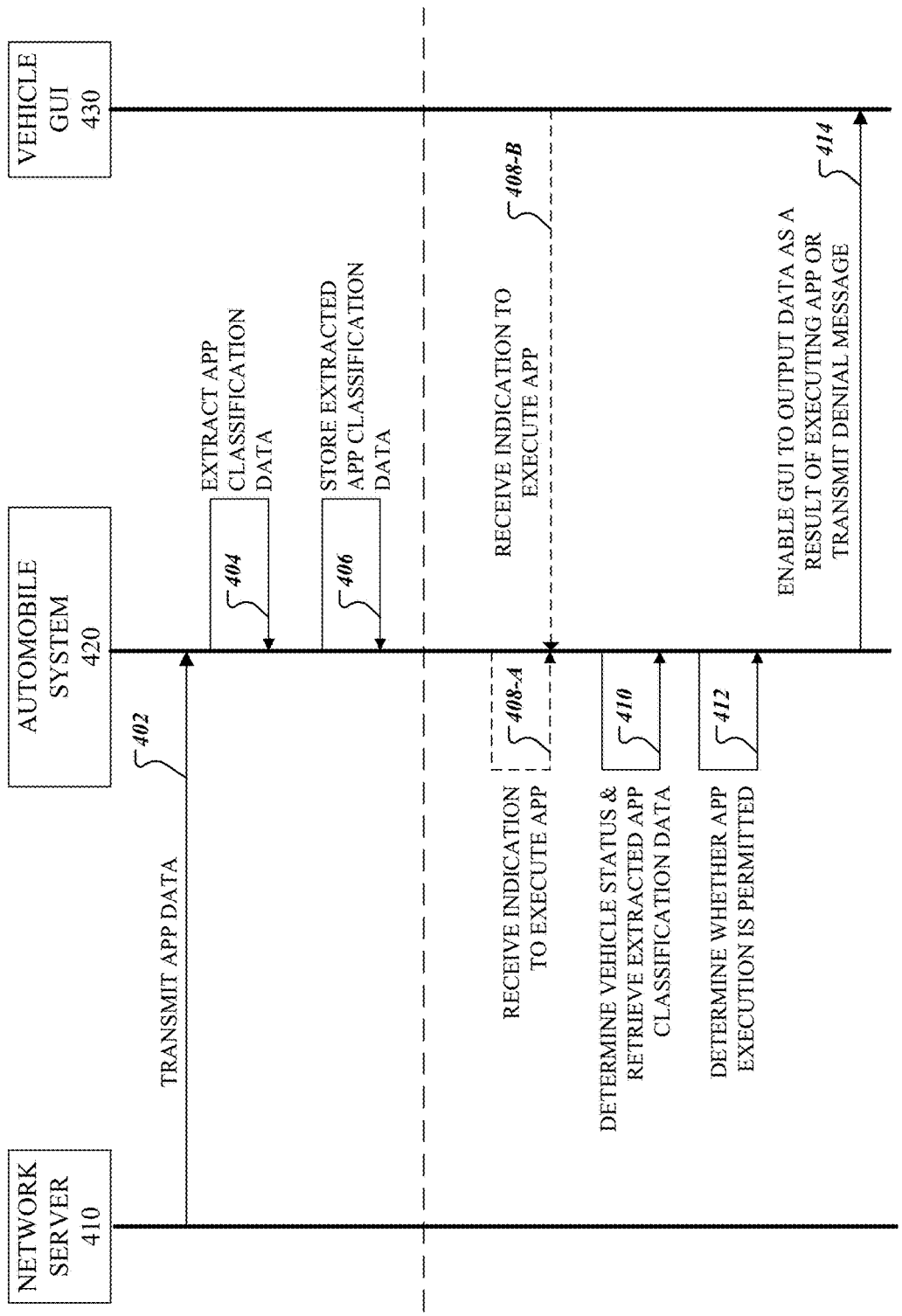
FIG. 4 depicts a flowchart of an exemplary method to enable or disable execution of application in a vehicle.
Figure 5:
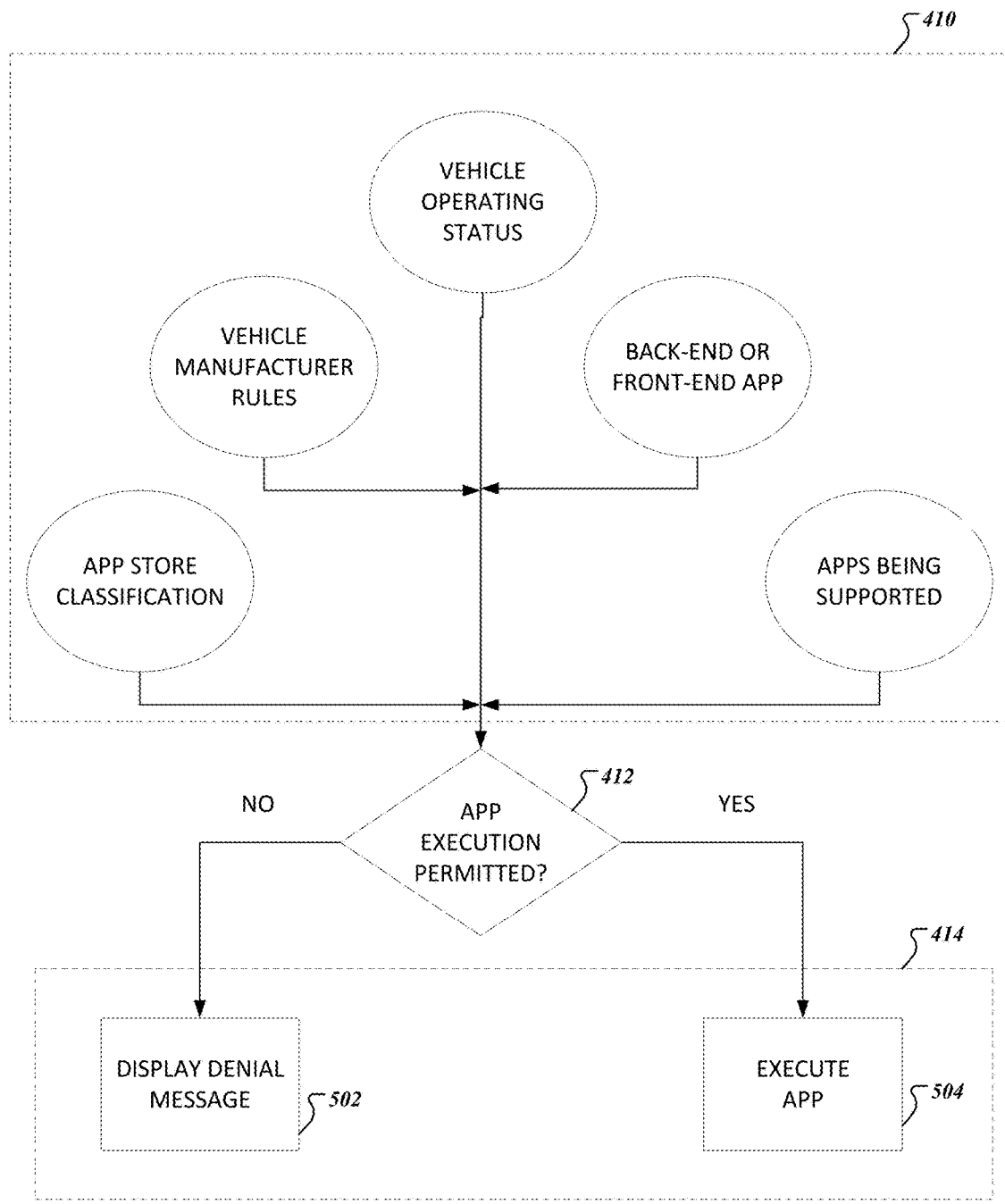
FIG. 5 depicts a flowchart of an exemplary method to enable or disable execution of application in a vehicle.

Referring to FIG. 4, a vehicle processing system 420 may be connected to a network server 410 and a vehicle GUI 430. The vehicle processing system 420 may communicate with the network server 410 to receive application data (402). For example, if a driver of a vehicle would like to upload content or application data for a particular application from an application store, the vehicle processing system 420 may wirelessly communicate with the network server 410 to obtain the content or application data.

In some implementations, application data for installing, updating, or executing an application may be requested by the vehicle processing system 420. In some implementations, application data for an application installed in the vehicle may be transmitted by a server of a vehicle manufacturer. In some implementations, application data may be received by the vehicle processing system 420 through a portable electronic device of the driver, and, in some implementations, the application data may be received by the vehicle processing system 420 from the network server 410 without using a portable electronic device of the driver. In some cases, application data may be periodically requested by the vehicle processing system 420. In some cases, application data may be requested if no application data is available for an application for which an execution request has been received.

After receiving application data from the network server 410, the vehicle processing system 420 may extract classification data for the application from the received application data (404). The classification data may include various types of data including, for example, data classifying the application as a front-end application or a back-end application, data indicating a version of the application, data indicative of a signature of the application, data indicating the vehicle operating modes that the application can be executable in, data indicating a vehicle make and model on which the application is executable, metadata associated with the application, and binary hash data for preventing application execution.

A front-end application refers to an application that a driver can directly interact with. Examples of front-end applications include, but are not limited to, a phone call application, web-browsing application, a text messaging application, and a navigation application.

A back-end application refers to a service application that does not require direct interaction with a driver. Back-end applications may be connected to front-end applications. Examples of back-end applications include, but are not limited to, applications that monitor performance of the vehicle or parts of the vehicle, applications that control certain functions such as lighting or windshield wiper activation, or applications that provide services for other applications such as content providers and broadcast receivers.

Classification data may also include an indication of a safety level of an application and the vehicle operating modes the application may be used in. For example, in some implementations, an application may be classified as being unsafe for use when a driver is driving and the application may also be designated as being executable only when the vehicle is in a parked vehicle operation status.

In some implementations, data indicating a version of an application may include data indicating a safety level of the particular version of the application received by the automobile system 420. For example, in some cases, one version of an application may be classified as safe to execute while a vehicle is moving, whereas another version of the application may be classified as being unsafe to execute while a vehicle is moving. Data indicating a version of an application may also include likes to other versions of the application. For example, a version of an application that is classified as being unsafe to execute while a vehicle is moving may have a link to install, execute, or run a version of the application that is classified as being safe to execute while a vehicle is moving.

In general, applications may be classified as being safe or unsafe for use when a vehicle is in motion, and any vehicle operation status may be designated for the applications. In some implementations, if classification data for an application cannot be extracted or obtained, the vehicle processing system 420 may obtain the classification data from additional data sources such as a vehicle manufacturer server or an Internet database or server.

In some implementations, an application may be classified as being safe for use when a vehicle is in motion and the application may be designated as being executable in any vehicle operation status. In some implementations, an application may be classified as being unsafe for use when a vehicle is in motion and the application may be designated as being non-executable in any vehicle operation status involving vehicle movement. In some implementations, an application may be designated as being executable upon the satisfaction of one or more conditions. These conditions may include, but are not limited to, for example, weather conditions, driving conditions, traffic conditions, lighting conditions, application-specific use conditions, and engine conditions. Application-specific use conditions include, for example, conditions specifying that an application can be executed provided another application is also executed.

In some implementations, a vehicle manufacturer may limit a number or the types of applications that can be installed in a vehicle manufactured by the vehicle manufacturer. For example, a particular vehicle manufacturer may block applications designed for vehicles manufactured by other vehicle manufacturers from being installed in a vehicle manufactured by the particular vehicle manufacturer. In another example, a particular vehicle manufacturer may allow applications that can control or affect only particular components or programs in a vehicle to be installed in a vehicle.

In some implementations, if classification data for an application cannot be extracted or obtained, the vehicle processing system 420 may designate the application as being executable only in the parked vehicle operation status. In general, the classification data associated with an application may be provided by an application store, an application developer, or a vehicle manufacturer. For example, when developing an application, an application developer may include metadata in the application that includes classification data specifying a vehicle operation status in which the application can be executed in.

Various criteria can be used to classify an application as being safe or unsafe. For example, in some cases, an application that requires a task, such as a driver input, to be performed for a duration longer than a threshold time, for example, 1.5 seconds, may be determined as being unsafe for execution when a vehicle is in motion. In some cases, an application that does not have a GUI configured for a vehicle, a driver, or a vehicle GUI use may be determined as being unsafe for execution in a vehicle.

Extracted classification data is stored in any suitable storage device in the vehicle processing system 420 (406). In some implementations, the extracted classification data may be stored in a cloud-based storage system.

After storing the extracted classification data, the vehicle processing system 420 waits to receive an indication to execute an application (408-A, 408-B). The indication to execute an application may be generated through several suitable means or through a vehicle trigger event. In some implementations, the vehicle trigger event may include, for example, a change in the vehicle operation status, such as when a vehicle operation status changes from a parking status to a moving status, or vice-versa. In some implementations, an indication to execute an application may be generated when a driver inputs a request to execute an application or a driver action prompts an application to be executed. In some implementations, an indication to execute an application may be generated because another vehicle application requests the application to be executed.

In response to receiving the indication to execute an application, the vehicle processing system 420 determines the current vehicle operating status and retrieves the stored extracted classification data associated with the application (410). As shown in more detail in FIG. 5, in operation 410, the vehicle processing system 420 may extract or determine information including one or more of an application store classification of the application, vehicle manufacturer rules associated with the application, one or more vehicle operating statuses in which the application is permitted to be executed, classification data indicating whether the application is a back-end application or a front-end application, and data indicating whether the application is supporting another application or is being supported by other applications.

For example, in some implementations, the vehicle processing system 420 may determine a classification of the application provided by an application store that provides the application for user download. The classification of the application may be included as metadata when an application is downloaded from the application store. In some cases, the classification of the application may be, for example, a tag indicating that the application can be executed in a vehicle while the vehicle is in motion. In some cases, the classification of the application may be, for example, a tag indicating that the application cannot be executed in a vehicle while the vehicle is in motion. In some cases, the classification of the application may be, for example, a tag indicating that the application can only be executed in a vehicle upon the satisfaction of certain conditions.

In some implementations, the vehicle processing system 420 may obtain the vehicle manufacturer rules for the vehicle. The vehicle manufacturer rules may be obtained from one or more of a storage database in the vehicle, a cloud database associated with the vehicle manufacturer, and one or more servers of the vehicle manufacturer. The vehicle manufacturer rules may provide one or more criteria for permitting the installation or use of an application in the vehicle. For example, in some cases, the vehicle manufacturer rules may block applications from other vehicle manufacturers from being installed in the vehicle or applications that are determined to be a safety hazard. Blocked applications may include, for example, gaming applications and other applications that the vehicle manufacturer has determined as being detrimental to a driver's ability to operate the vehicle. In some cases, the vehicle manufacturer rules may limit applications that can be executed in a vehicle to be limited to a particular category of applications. For example, the category of approved applications may include one or more of navigation-support applications, vehicle maintenance and operations-related applications, road side assistance applications, ambient environmental control applications, and various other applications determined by the vehicle manufacturer as being safe for execution.

In some implementations, the vehicle processing system 420 determines whether the application to be executed is classified as a back-end application or a front-end application. Data classifying an application as a back-end or front-end application may be obtained from various suitable sources. For example, in some cases, data classifying an application as a back-end or front-end application may be included as metadata in an application file. In some cases, data classifying an application as a back-end or front-end application may be obtained from an application store. In some cases, data classifying an application as a back-end or front-end application may be generated by the vehicle.

In some implementations, the vehicle processing system 420 determines a version of an application and whether the version corresponds to a version that can be used when a vehicle is in motion. For example, for a particular application, a version having a user interface that does not distract a driver may be classified as being safe to execute in a moving vehicle. Another version of the same application having a more complex user interface that does distract a driver may be classified as being unsafe to execute in a moving vehicle. If a version of an application is determined as being unsafe, the vehicle processing system 420 may determine if other versions of the application that are classified as being safe are available for execution. If safer versions are available, the vehicle processing system 420 may then obtain the information for one or more of the safer versions of the application from the classification data or various other suitable sources and use the safe versions for operations 410, 412, and 414.

In some implementations, the vehicle processing system 420 determines whether the application to be executed is configured to support other applications or whether other applications are required to be executed upon execution of the application to be executed. To make this determination, the vehicle processing system 420 may determine if the application to be executed requires input or support from other applications and if other applications require input or support from the application to be executed upon execution of the application. This determination allows the vehicle processing system 420 to estimate the effect on bandwidth, execution, and processing speeds in the vehicle processing system 420 if execution of the application is permitted.

In operation 410, the vehicle processing system 420 also determines the vehicle operating status using various suitable means including, for example, data received from one or more vehicle parts, sensors, gears, and processors. Vehicle operating status may include various suitable types of information including, for example, information indicative of whether the vehicle is moving or not, status indications of various vehicle parts, for example, lights, gears, sensors, low batteries, and ambient and environmental conditions.

For instance, the vehicle processing system 420 may determine the vehicle operating status by identifying the current gear position of the vehicle. As an example, the vehicle processing system 420 may determine that the vehicle operating status of the vehicle is stationary or not moving if the vehicle's gear is in the parking position. In some cases, the vehicle processing system 420 may determine the vehicle operating status, such as a speed or direction of the vehicle, based on data received from speed sensors and accelerometers in the vehicle. In some implementations, the vehicle processing system 420 may also determine other conditions such as, for example, vehicular lighting conditions, application-specific use conditions, a number of passengers in the vehicle, and engine conditions, when determining the vehicle operating status. Vehicular lighting conditions may include for example, conditions indicating the internal and external light(s) status of the vehicle.

In some implementations, the vehicle processing system 420 may determine network connectivity and internal processing speeds and diagnostics when determining the vehicle operating status. For example, the vehicle processing system 420 may determine that the vehicle is not connected, has a weak wireless connection, or a strong wireless connection to a wireless network, such as a cellular network or the Internet. In some cases, the vehicle processing system 420 may determine the status of one or more processors or components of the vehicle processing system 420 such that any processing errors or delays in executing applications may be identified.

After determining the current vehicle operating status and retrieving the classification data associated with the application (410), the vehicle processing system 420 determines whether execution of the application is permitted (412). The vehicle processing system 420 may use one or more rules to determine whether execution of the application is permitted.

In some implementations, the vehicle processing system 420 permits an application to be executed if the current vehicle operating status or conditions match the application's designated vehicle operating status or conditions. For example, classification data for a navigation application may include an indication that the navigation application can be executed in any vehicle operating status or condition. Classification data for an electronic gaming application may include an indication that the electronic gaming application can only be executed when the vehicle is stationary. Classification data for a messaging application may include an indication that the messaging application can only be executed if operated when using a supporting speech-to-text or speech recognition application. Accordingly, if the vehicle operating status indicates that the vehicle is stationary, the navigation application, electronic gaming application, and messaging application may be permitted to be executed in any order. If the vehicle operating status indicates that the vehicle is moving, the navigation application will be permitted to be executed, and the electronic gaming application will not be permitted to be executed. The messaging application may conditionally be executed if the driver agrees to use a speech-to-text or speech recognition application such that the driver may compose a text message using speech instead of the driver's hands.

In some implementations, the vehicle processing system 420 may perform one or more authentication and verification operations to determine whether execution of the application is permitted. For example, in some implementations, the vehicle processing system 420 may apply a hash function to the binary hash data to determine if the application is prevented from being executed. In some implementations, the vehicle processing system 420 verifies the application signature or a source from which the application has been received or generated to determine if the application can be trusted and executed.

In some implementations, the operation of determining whether execution of the application is permitted includes determining which version of an application is permitted to be executed. As noted above, if a version of an application is determined as being unsafe, in some cases, the vehicle processing system 420 may execute a safe version of the application that is available and can be obtained by the vehicle processing system 420.

Various additional criteria and rules may be used to determine whether execution of the application is permitted. In some implementations, if the application is a back-end application, the vehicle processing system 420 will permit execution of the application if execution of other applications supported by the back-end application will not detrimentally affect to the driver's ability to driver. For example, if a navigation application is affected detrimentally by permitting execution of the back-end application such that the navigation application may not be able to provide the driver timely instructions for navigation, the back-end application may not be permitted to be executed. In general, if the likely effect of permitting execution of a back-end application on a front-end application, for example, a navigation application, is determined to be detrimental by an amount greater than or equal to a threshold amount, the vehicle processing system 420 will not permit the back-end application to be executed. If the likely detrimental effect on a front-end application is less than the threshold amount, the vehicle processing system 420 will permit the back-end application to be executed. The likely effects may include, for example, effects on the processing capacity and time to execute an application.

In some implementations, if an application to be executed is a front-end application, the vehicle processing system 420 may permit execution of the front-end application and any additional back-end applications relied upon by the front-end application for data or input to be executed. In some cases, if one or more back-end applications is prohibited from being executed under the current vehicle operating status or rules, the vehicle processing system 420 may permit execution of the front-end application and only the back-end applications relied upon by the front-end application for data or input that are not prohibited from being executed. A message may be displayed to the driver indicating that a back-end application supporting a front-end application to be executed is prohibited. The driver may then, in some cases, provide an input to the vehicle processing system 420 indicating that the driver is still interested in executing the front-end application if the back-end application cannot be executed. In some cases, the driver may provide an input to the vehicle processing system 420 indicating that the driver is no longer interested in executing the front-end application if the back-end application cannot be executed.

In some implementations, the vehicle processing system 420 may determine whether execution of an application is in compliance with local jurisdictional rules. For example, in some states, sending text messages while driving is illegal. However, in other states, sending text messages while driving is legal. The vehicle processing system 420 may determine a location of a vehicle, obtain legal rules for executing an application in the state in which the vehicle is located in, and determine whether the application to be executed is in compliance with the legal rules of the state in which the vehicle is currently located in. Location information of the vehicle may be obtained using various suitable systems, such as a global positioning system (GPS), real-time locating systems (RLTS), satellite location services, cellular location systems, and other network-based location systems.

In some implementations, if an application is designated as being executable only in a particular vehicle make and model, the vehicle processing system 420 will prevent execution of the application in any vehicle that does not match the particular vehicle make and model specified in the classification data associated with the application. In some implementations, the vehicle processing system 420 will permit execution of the application only if the application is provided by a vendor or vehicle manufacturer allowed by the vehicle manufacturer.

If the vehicle processing system 420 determines that execution of the application is permitted, the vehicle processing system 420 executes the application and any associated operations and functions (414 and 504). The vehicle processing system 420 may control the vehicle GUI 430 to output data generated as a result of executing the application. For example, in some cases, if a new application is being executed, the vehicle GUI 430 may display a GUI corresponding to the GUI of the application. In some implementations, an audio or visual message may be output to the driver indicating that execution of the application has begun.

If the vehicle processing system 420 determines that execution of the application is not permitted, the vehicle processing system 420 transmits a denial message indicating that execution of the application has been denied (414 and 502). The denial message may be transmitted in various suitable manner. For example, in some implementations, the denial message is output by a speaker. In some implementations, content of the denial message is output by a graphical user interface in the vehicle. In some implementations, the denial message is transmitted to a portable electronic device associated with a driver of the vehicle. In some implementations, the denial message may include an indication that an application has been terminated, paused, delayed, or blocked. Notifications for preventing the execution of back-end applications are important because without the denial message, the driver may not be aware that the back-end application has been terminated, paused, delayed, or blocked.

After a denial message is received by the vehicle GUI 430 and the contents of the denial message are displayed to the driver, the vehicle GUI 430 may return to a default screen for the vehicle GUI 430.

In some implementations, if execution of a particular version of an application is not permitted, the vehicle processing system 420 may obtain another version of the application that is permitted for execution, if available, and may execute the permitted version. When the permitted version of the application is utilized, a message may be output by the vehicle processing system 420 to the driver indicating that the requested version of the application has been blocked, and a safe version of the application is being executed. The vehicle processing system 420 may then prompt the driver to indicate whether the driver would like to continue or terminate execution of the safe version of the application. If the driver would like the vehicle processing system 420 to continue to execute the safe version of the application, the safe version of the application may, in some cases, continue to be executed until the vehicle engine is turned off, or, in some cases, may be executed until a change in the vehicle operation status is detected. In the latter scenario, if the vehicle operation status changes to indicate that the vehicle is no longer moving, the vehicle processing system 420 may then execute the version of the application that was initially not permitted and blocked.

Implementations described above disclose a method through which vehicle applications may be executed, blocked, or terminated to improve passenger and driver experience and safety when one or more applications are being executed by a vehicle processing system 420 while the driver is operating a vehicle. Although the above-described implementations indicate that vehicle applications may be executed, blocked, or terminated, in some implementations, instead of blocking or terminating an application, the application may be paused until a vehicle operating status or conditions that are permitted by the application or by the rules of the vehicle processing system 420 are detected.

The above-described method provides several advantages to a user including, for example, controlling applications that can be executed in a vehicle without requiring a driver's input while the driver is in a moving vehicle; enhancing the safety of passengers and the driver by blocking applications that may distract the driver; and enhancing the overall driver experience in a vehicle by performing vehicle diagnostics and limiting or blocking back-end applications that may slow down front-end applications from working in a seamless manner while the driver is driving the vehicle. In some implementations, applications that are trusted by a vehicle manufacturer can manipulate the vehicle GUI to display their own, unique user interface.

Figure 6:
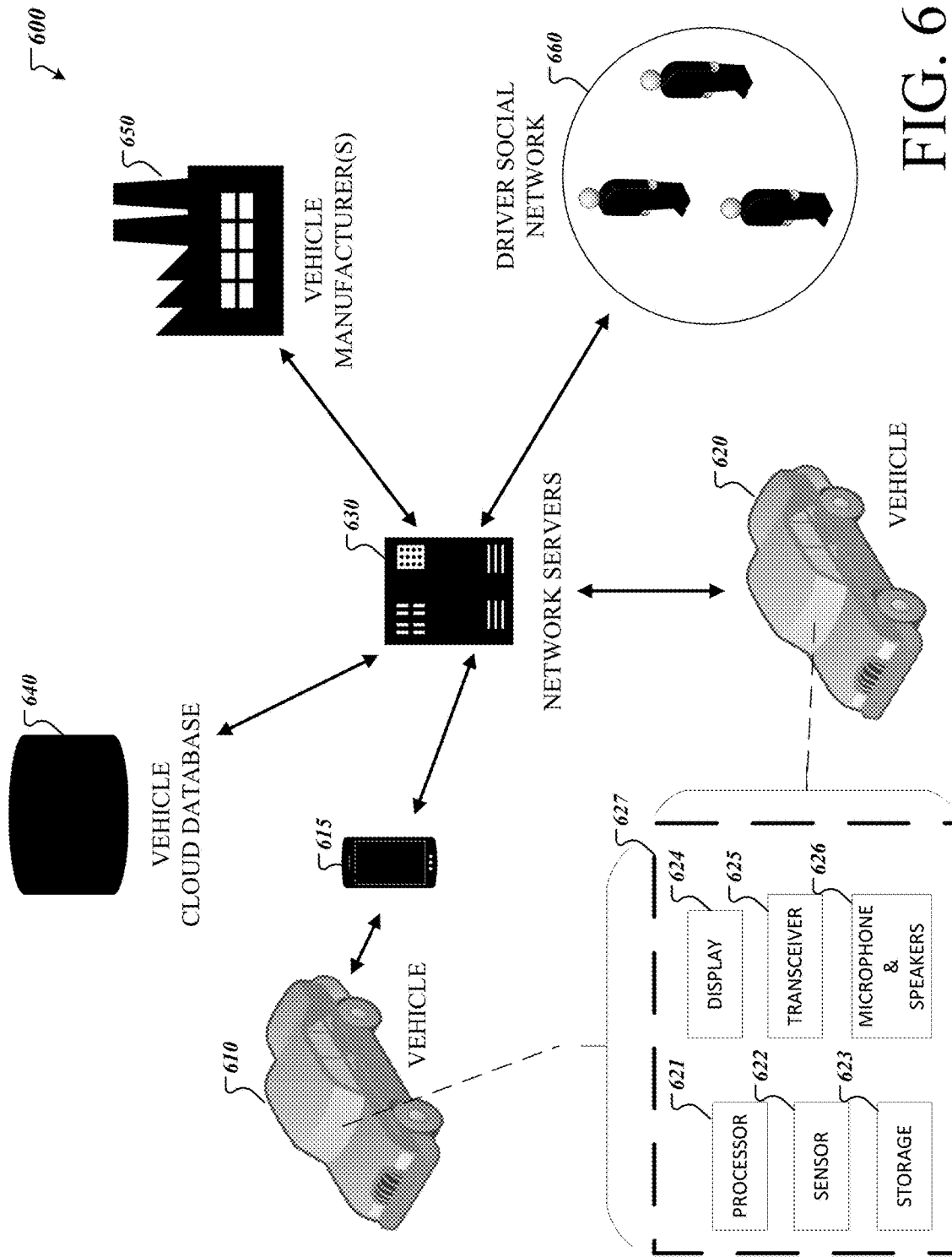
FIG. 6 depicts an exemplary system supporting application execution in a vehicle.

The above-described method may be implemented in the system 600 illustrated in FIG. 6. System 600 includes a vehicle 610, user device 615, vehicle 620, one or more network servers 630, a vehicle cloud database 640, one or more vehicle manufacturers 650, and one or more networks including a driver social network 660. Although two vehicles 610, 620 are shown in system 600, any suitable number of vehicles may be present in the system 600 at any time. Each vehicle 610, 620 may include a vehicle processing system 627 that includes a processor 621, sensors 622, a storage 623, a display 624, a transceiver 625, and microphone and speakers 626.

System 100 may include one or more networks that are configured to provide network access, data transport, and other services to any interface connected to the one or more networks. In general, the one or more networks may include and implement commonly-defined network architectures including those defined by standards bodies, such as the Global System for Mobile communication (GSM) Association, the Internet Engineering Task Force (IETF), and the Worldwide Interoperability for Microwave Access (WiMAX) forum. For example, the one or more networks may implement one or more of a GSM architecture, a General Packet Radio Service (GPRS) architecture, a Universal Mobile Telecommunications System (UMTS) architecture, and an evolution of UMTS referred to as Long Term Evolution (LTE). The one or more networks may implement a WiMAX architecture defined by the WiMAX forum or a Wireless Fidelity (WiFi) architecture. The one or more networks may include, for instance, a local area network (LAN), a wide area network (WAN), the Internet, a virtual LAN (VLAN), an enterprise LAN, a layer 3 virtual private network (VPN), an enterprise IP network, or any combination thereof.

The one or more networks may include access points, storage systems, cloud systems, modules, one or more databases including vehicle cloud database 640, and servers including the one or more network servers 630. The one or more network servers 630 may include network server 410 and any suitable computing device coupled to the one or more networks, including but not limited to a personal computer, a server computer, a series of server computers, a mini computer, and a mainframe computer, or combinations thereof. The one or more network servers 630 may also include a web server, or a series of servers, running a network operating system, examples of which may include but are not limited to Microsoft® Windows® Server, Novell® NetWare®, or Linux®. The one or more network servers 630 may include servers of vehicle manufacturers or servers for providing applications such as Google Android®-based applications. The one or more network servers 630 may be used for and/or provide cloud and/or network computing. Although not shown in the figures, the server may have connections to external systems providing messaging functionality such as e-mail, SMS messaging, text messaging, and other functionalities, such as advertising services, search services, etc.

In some implementations, the one or more networks may include a cloud system that may provide Internet connectivity and other network-related functions. The cloud system may provide storage services for data transmitted between components of system 600.

System 600 also includes a vehicle cloud database 640, which may include a cloud database or a database managed by a database management system (DBMS). A DBMS may be implemented as an engine that controls organization, storage, management, and retrieval of data in a database. DBMSs frequently provide the ability to query, backup and replicate data, enforce rules, provide security, do computation, perform change and access logging, and automate optimization. A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

In some implementations, the vehicle cloud database 640 may store information indicative of rules and/or conditions for executing application in vehicles. The vehicle cloud database 640 may categorize the rules and/or conditions by vehicle manufacturer or by vehicle make and model. The vehicle cloud database 640 may also store classification data for classifying vehicle applications. The classification data may be obtained from various suitable sources including, for example, social networks, application stores, one or more vehicle manufacturers 650, and the Internet.

The one or more network servers 630 and vehicle cloud database 640 may also be configured to communicate with one or more vehicle manufacturers 650 and one or more social networks 660 associated with a driver. The one or more vehicle manufacturers 650 may include any vehicle manufacturer such as Toyota, Honda, Mercedes-Benz, etc. The social networks 660 may include any suitable network such as Facebook, Twitter, Instagram, and may also include social network websites and blogs. The social networks 660 may include friends, family, or followers of a driver. The one or more vehicle manufacturers 650 may transmit updates and various information to the one or more network servers 630 and vehicle cloud database 640 including, for example, data regarding vehicle settings of new vehicle models, changes in vehicle setting parameters of existing vehicle models, and information and rules regarding vehicle safety settings and vehicle applications.

As shown in FIG. 6, network servers 630 may communicate directly with a vehicle 620 or may communicate with a vehicle 610 through a user device 615.

Each of vehicle 610 and vehicle 620 may be one of an automobile, rickshaw, moped, motor cycle, bicycle, snowmobile, truck, Segway, etc. Vehicle 610 and vehicle 620 may each correspond to one of various suitable makes and models including, for example, a Honda Civic, Honda Accord, Toyota Camry, Volkswagen Beetle, Mercedes Benz CLK, BMW 5 series, Chevrolet Corvette, etc.

The user device 615 may be any suitable portable electronic device. Examples of a portable electronic device include, but are not limited to, a computer, lap top, personal digital assistant, electronic pad, electronic notebook, telephone, smart phone, television, smart television, a watch, smart glasses, or any electronic device that is connected to a network and has a display. The user device 615 may be any combination of hardware and software and may execute any suitable operating system such as an Android® operating system.

The user device 615 may be used by a driver of vehicle 610. The user device 615 may include an application that allows the user device 615 to communicate with vehicle 610 and one or more network servers 630. For example, in some cases, an application on the user device 615 may control the user device 615 to communicate with the vehicle processing system 627 in vehicle 610.

In some implementations, a driver may download an application from the one or more networks using the user device 615 and may forward data for installing or executing the application to the vehicle processing system 627 in vehicle 610. Thus, in some cases, a driver or user of vehicle 610 may download a vehicle application for vehicle 610 using user device 615.

FIG. 6 also illustrates an exemplary implementation of a vehicle processing system 627. Vehicle processing system 627 may correspond to vehicle processing system 420. As shown in FIG. 6, the vehicle processing system 627 may include a processor 621, sensors 622, a storage 623, a display 624, a transceiver 625, and microphone and speakers 626.

A transceiver 625 includes a transmitter and a receiver and may be utilized to communicate with other devices in system 600 and components in the vehicle processing system 627. The transceiver 625 may include amplifiers, modulators, demodulators, antennas, and various other components. The transceiver 625 may direct data received from other devices in system 600 to other components of the vehicle processing system 627 such as the processor 621 and storage 623. The transceiver 625 may also direct data received from components of the vehicle processing system 627 to other devices in system 600.

Storage 623 may include one or more mass storage devices, for example, magnetic, magneto optical disks, optical disks, EPROM, EEPROM, flash memory devices, and may be implemented as internal hard disks, removable disks, magneto optical disks, CD ROM, or DVD-ROM disks for storing data. In some cases, the storage unit 623 may store rules for executing vehicle applications.

The vehicle processing system 627 may include one or more sensors 622 and various user interface components such as a display 624, microphone and speakers 626, other suitable input unit(s) to facilitate interactions with drivers. In some implementations, the display 624, input unit(s), and at least one of the sensors 622 may be combined into a single integrated component, and, in some implementations, the display 624, input unit(s), and at least one of the sensors 622 may be multiple components.

Display 624 may be implemented through suitable displays including, for example, a projection display, a liquid crystal display (LCD), or light emitting diode (LED) display, to display various data. The display 624 may display the vehicle GUI 430.

Sensors 622 may include, for example, an optical sensor, capacitive sensor, charge-coupled device sensor, gyroscope, microphone, altimeter, impact sensor, piezoelectric sensor, motion sensor, biosensor, active pixel sensor, and various other sensors. The sensors 622 may detect one or more vehicular and environmental conditions, may identify a current vehicle operating status or vehicle component status, or may be used to receive inputs from a driver.

The input unit(s) may include various devices that are configured to receive one or more inputs. For example, the input unit may include a mouse, touch pad, or keyboard for receiving alphanumeric text.

The microphone and speakers 626 may receive audio signals from the driver, and may output data provided by the vehicle processing system 627 and directed for a vehicle driver or passenger. For example, messages, such as a denial message, may be communicated through audio signals emitted from speakers 626, and certain applications, such as speech-to-text applications may be executed by receiving audio or voice signals through the microphone 626.

The processor 230 may include one or more processors coupled to all components of the vehicle processing system 627, and may control the operations of the vehicle processing system 627. The processor 230 may include various logic circuitry and programs to execute the various implementations described herein.

As described above, the vehicle processing system 627 includes various components to implement commands and operations and may determine an operation status of the vehicle or components in a vehicle 610, 620. Based, in part, on the vehicle operating status, the vehicle processing system 627 may control application execution in a vehicle 610, 620. In some implementations, the vehicle processing system 627 may also provide status information about the vehicle to system 600 elements such as the one or more network servers 630 or the user device 615.

Embodiments and all of the functional operations and/or actions described in this specification may be implemented in digital electronic circuitry, or in computer software, firmware, or hardware, including the structures disclosed in this specification and their structural equivalents, or in combinations of one or more of them. Embodiments may be implemented as one or more computer program products, for example, one or more modules of computer program instructions encoded on a computer readable medium for execution by, or to control the operation of, data processing apparatus. The computer-readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, for example, code that constitutes processor firmware, a protocol stack, a database management system, an operating system, or a combination of one or more of them. A propagated signal is an artificially generated signal, for example, a machine-generated electrical, optical, or electromagnetic signal that is generated to encode information for transmission to suitable receiver apparatus.

A computer program, also known as a program, software, software application, script, or code, may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data in a single file dedicated to the program in question, or in multiple coordinated files. A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer may not have such devices. Moreover, a computer may be embedded in another device, for example, a tablet computer, a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory may be supplemented by, or incorporated in, special purpose logic circuitry.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. Moreover, the separation of various system components in the embodiments described above should not be understood as requiring such separation in all embodiments, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A computer-implemented method comprising:
   obtaining, from an application server and by a vehicle processor of a vehicle, classification data associated with a plurality of applications executable in the vehicle, the classification data comprising, for each of one or more applications in the plurality of applications, an indication of a first safety level of the application, an indication of a second safety level of the application, one or more vehicle operating modes associated with the first safety level and during which the application is configured to be executed in the vehicle, and one or more vehicle operating modes associated with the second safety level and during which the application is configured not to be executed in the vehicle;
   receiving, by the vehicle processor, an indication to execute a first application from among the plurality of applications;
   determining, by the vehicle processor, an operating status of the vehicle;
   determining, by the vehicle processor, that the first safety level of the first application is not satisfied based on the operating status of the vehicle corresponding to the one or more vehicle operating modes associated with the second safety level of the first application;
   in response to determining that the first safety level of the first application is not satisfied, generating, by the vehicle processor, a recommendation for executing a second application that has vehicle operating modes in a first safety level that correspond to the operating status of the vehicle;
   outputting, by the vehicle processor, the recommendation for executing the second application;
   receiving, by the vehicle processor, data indicative of a user selection to execute the second application; and
   in response to receiving the data indicative of the user selection to execute the second application, executing the second application in the vehicle.

2. The computer-implemented method of claim 1, wherein the classification data associated with the plurality of applications comprises:
   for each of the one or more applications in the plurality of applications:
      data indicating that the application is a front-end application or a back-end application;
      data indicating a vehicle make and model on which the application is executable;
      metadata associated with the application; and
      the indication of the first safety level of the application indicates that the application is designated as executable when the vehicle is in motion.

3. The computer-implemented method of claim 1, wherein receiving the indication to execute the first application comprises one of:
   receiving a user input to execute the first application in the vehicle;
   receiving an instruction from a third application to execute the first application in the vehicle; and
   receiving an instruction to execute the first application in the vehicle in response to a vehicle trigger event.

4. The computer-implemented method of claim 1, wherein obtaining the classification data associated with the plurality of applications comprises, for each of the one or more applications in the plurality of applications, one or more of:
   retrieving one or more portions of the classification data associated with the application from one or more storage devices in the vehicle; and
   receiving one or more second portions of the classification data associated with the application from the application server.

5. The computer-implemented method of claim 1, wherein determining, by the vehicle processor, the operating status of the vehicle comprises one or more of:
   determining a gear position the vehicle is operating in;
   determining a movement or speed of the vehicle; and
   determining a number of passengers in the vehicle.

6. The computer-implemented method of claim 1, further comprising:
   receiving application data from the application server;
   extracting the classification data associated with the plurality of applications from the application data; and
   storing the classification data associated with the plurality of applications in a vehicle storage unit or a cloud-based database.

7. The computer-implemented method of claim 1, further comprising:
   in response to determining that the first safety level of the first application is not satisfied, transmitting a denial message indicating that execution of the first application is denied.

8. The computer-implemented method of claim 7, wherein:
   the denial message is output by a speaker;
   content of the denial message is output by a graphical user interface in the vehicle; or
   the denial message is transmitted to a portable electronic device associated with a driver of the vehicle.

9. The computer-implemented method of claim 7, wherein transmitting the denial message indicating that execution of the first application is denied comprises:
   transmitting an indication that execution of a back-end application has been terminated, paused, or delayed; or
   transmitting an indication that execution of a front-end application is blocked.

10. The computer-implemented method of claim 1, wherein executing the second application comprises:
    controlling a graphical user interface in the vehicle to display (i) output data associated with execution of the second application, and (ii) a graphical indicator indicating that the second application is configured to be executed when the vehicle is in motion.

11. The computer-implemented method of claim 1, wherein generating the recommendation for executing the second application comprises one or more of:
- determining whether the second application is a front-end application or a back-end application;
- determining a location of the vehicle; and
- obtaining one or more application execution rules based on the location of the vehicle.

12. The computer-implemented method of claim 11, wherein generating the recommendation for executing the second application further comprises:
- determining that the second application is a front-end application;
- determining that the operating status of the vehicle indicates a parked vehicle mode;
- determining that the location of the vehicle, the safety level, and the one or more application execution rules permit the execution of the second application; and
- in response to determining that the location of the vehicle, the safety level, and the one or more application execution rules permit the execution of the second application, generating the recommendation to execute the application.

13. The computer-implemented method of claim 11, wherein generating the recommendation for executing the second application further comprises:
- determining that the second application is a back-end application;
- in response to determining that the second application is a back-end application, determining a likely effect of executing the second application on one or more front-end applications;
- determining that the likely effect of executing the second application on one or more front-end applications is less than a threshold amount;
- determining that the location of the vehicle, the safety level, and the one or more application execution rules permit the execution of the second application; and
- in response to determining that the location of the vehicle, the safety level, and the one or more application execution rules permit the execution of the second application, generating the recommendation to execute the application.

14. A non-transitory computer-readable storage medium comprising instructions, which, when executed by a vehicle processor in a vehicle, cause the vehicle processor to perform actions comprising:
- obtaining, from an application server, classification data associated with a plurality of applications executable in the vehicle, the classification data comprising, for each of one or more applications in the plurality of applications, an indication of a first safety level of the application, an indication of a second safety level of the application, one or more vehicle operating modes associated with the first safety level and during which the application is configured to be executed in the vehicle, and one or more vehicle operating modes associated with the second safety level and during which the application is configured not to be executed in the vehicle;
- receiving an indication to execute a first application from among the plurality of applications;
- determining an operating status of the vehicle;
- determining that the first safety level of the first application is not satisfied based on the operating status of the vehicle corresponding to the one or more vehicle operating modes associated with the second safety level of the first application;
- in response to determining that the first safety level of the first application is not satisfied, generating a recommendation for executing a second application that has vehicle operating modes in a first safety level that correspond to the operating status of the vehicle;
- outputting the recommendation for executing the second application;
- receiving data indicative of a user selection to execute the second application; and
- in response to receiving the data indicative of the user selection to execute the second application, executing the second application in the vehicle.

15. The non-transitory computer-readable storage medium of claim 14, wherein generating the recommendation for executing the second application comprises one or more of:
- determining whether the second application is a front-end application or a back-end application;
- determining a location of the vehicle; and
- obtaining one or more application execution rules based on the location of the vehicle.

16. The non-transitory computer-readable storage medium of claim 15, wherein generating the recommendation for executing the second application further comprises:
- determining that the second application is a front-end application;
- determining that the operating status of the vehicle indicates a parked vehicle mode;
- determining that the location of the vehicle, the safety level, and the one or more application execution rules permit the execution of the second application; and
- in response to determining that the location of the vehicle, the safety level, and the one or more application execution rules permit the execution of the second application, generating the recommendation to execute the application.

17. The non-transitory computer-readable storage medium of claim 15, wherein generating the recommendation for executing the second application further comprises:
- determining that the second application is a back-end application;
- in response to determining that the second application is a back-end application, determining a likely effect of executing the second application on one or more front-end applications;
- determining that the likely effect of executing the second application on one or more front-end applications is less than a threshold amount;
- determining that the location of the vehicle, the safety level, and the one or more application execution rules permit the execution of the second application; and
- in response to determining that the location of the vehicle, the safety level, and the one or more application execution rules permit the execution of the second application, generating the recommendation to execute the application.

18. A system comprising:
- one or more computers and one or more storage devices storing instructions that are operable and when executed by the one or more computers, cause the one or more computers to perform actions comprising:
  - obtaining, from an application server, classification data associated with a plurality of applications executable in the vehicle, the classification data comprising, for each of one or more applications in the plurality of applications, an indication of a first safety level of the application, an indication of a second safety level of the application, one or more vehicle operating modes associated with the first safety level and during which the application is configured to be executed in the vehicle, and one or more vehicle operating modes associated with the second safety level and during which the application is configured not to be executed in the vehicle;

receiving an indication to execute a first application from among the plurality of applications;

determining an operating status of the vehicle;

determining that the first safety level of the first application is not satisfied based on the operating status of the vehicle corresponding to the one or more vehicle operating modes associated with the second safety level of the first application;

in response to determining that the first safety level of the first application is not satisfied, generating a recommendation for executing a second application that has vehicle operating modes in a first safety level that correspond to the operating status of the vehicle;

outputting the recommendation for executing the second application;

receiving data indicative of a user selection to execute the second application; and in response to receiving the data indicative of the user selection to execute the second application, executing the second application in the vehicle.

19. The computer-implemented method of claim 1, wherein the second application is a safe version of the first application.

20. The computer-implemented method of claim 1, wherein generating the recommendation for executing the second application comprises:

determining that the second application is executable by applying a hash function to data of the second application.

* * * * *